United States Patent [19]

Hiruma

[11] 4,030,739
[45] June 21, 1977

[54] SUSPENSION SYSTEM

[75] Inventor: Mituo Hiruma, Kodaira, Japan

[73] Assignee: Nissan Motor Co., Ltd., Japan

[22] Filed: Sept. 9, 1975

[21] Appl. No.: 611,641

[30] Foreign Application Priority Data
Sept. 10, 1974 Japan .............................. 49-103419

[52] U.S. Cl. .............................. 280/708; 267/65 D
[51] Int. Cl.² ........................................ B60G 11/28
[58] Field of Search .......... 280/708, 688, 702, 704, 280/711, 714; 267/64 A, 65 D

[56] References Cited
UNITED STATES PATENTS

| 3,807,753 | 4/1974 | Ito ..................................... 280/708 |
| 3,913,938 | 10/1975 | Aikawa ............................ 280/708 |

Primary Examiner—Philip Goodman
Attorney, Agent, or Firm—Robert E. Burns; Emmanuel J. Lobato; Bruce L. Adams

[57] ABSTRACT

A piston slidably fitted in a fluid chamber is operatively connected to a level regulator valve located externally of a suspension unit and hydraulic fluid is fed and discharged into and from the fluid chamber by the opening of valves operated by a vehicle operator so that the piston is moved to operate the level regulator valve for shortening and lengthening the suspension unit independently of a load applied thereto.

7 Claims, 3 Drawing Figures

SUSPENSION SYSTEM

BACKGROUND OF THE INVENTION

The present invention relates generally to a vehicle level selector device of a hydropneumatic suspension unit externally of which an automatic level regulator valve is located and particularly to a vehicle level selector device of this type which is improved to hydraulically operate the level regulator valve to selectively lengthen and shorten the suspension unit so that the vehicle driver can operate a vehicle level selector lever with a minimum or slight operating force.

As is well known in the art, a hydropneumatic suspension unit is provided with a vehicle level selector device to selectively raise and lower the vehicle body with respect to the wheels or the road surface to a desired level independently of a load applied to the vehicle body. An ordinary level selector device is operatively connected to a casing of a vehicle level regulator valve located externally of the suspension unit and is operated to move the casing with respect to a valve spool of the level regulator valve to lengthen and shorten the suspension unit when the vehicle driver moves a vehicle level selector lever to select a desired level of the vehicle body.

A conventional level selector device has been constructed such that the casing of the level regulator valve is moved with respect to the valve spool thereof directly and mechanically by the action of the driver through a wire cable and a rod when the driver operates the level selector lever. Thus, the driver has been required to apply a considerably great operating force for operating the level selector level. Furthermore, it has been necessary to make the level selector device strong so that the device withstands the great operating force. Thus, the device has been expensive to manufacture and has required in the vehicle a bulk space to install it therein. As a result, it has been difficult to put the device into practical use.

SUMMARY OF THE INVENTION

It is, therefore, an object of the invention to provide a suspension system comprising a level selector device which is constructed such that a casing of a level regulator valve is moved with respect to a valve spool thereof by the force of hydraulic fluid pressure or the action of a spring so that the vehicle driver can operate the level selector lever with a minimum or slight operating force when he operates it.

BRIEF DESCRIPTION OF THE DRAWING

This and other objects and advantages of the invention will become more apparent from the following detailed description taken in connection with the accompanying drawings in which.

DESCRIPTION OF THE PREFERRED EMBODIMENTS

Figure 1:
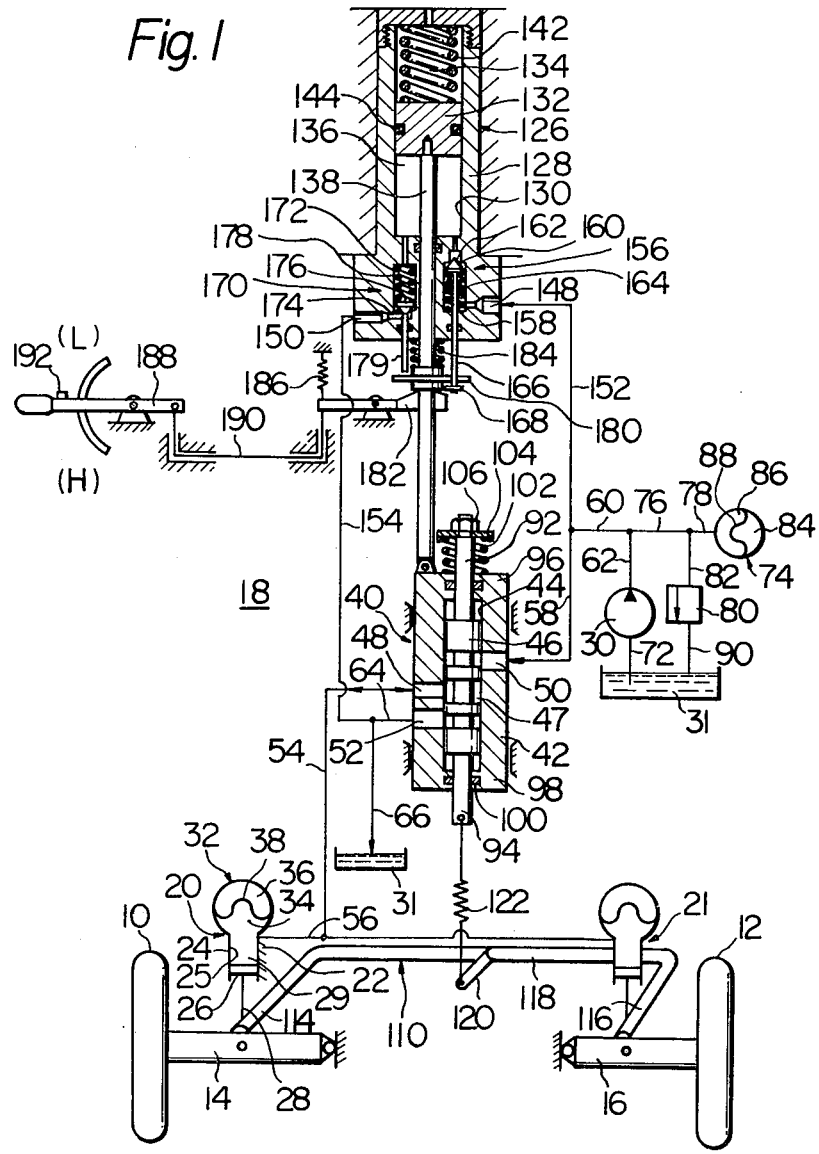
FIG. 1 is a schematic view of a preferred embodiment of a suspension system according to the invention.

Referring to FIG. 1 of the drawings, there is shown a portion of a vehicle which includes front or rear left and right wheels 10 and 12, and left and right suspension members or axles 14 and 16 connected respectively to the wheels 10 and 12, and a hydropneumatic suspension system according to the invention which is combined with or incorporated into the vehicle.

The hydropneumatic suspension system, generally designated by the reference numeral 18, comprises first and second retractable or compressible and extensible hydropneumatic suspension units or struts 20 and 21 which are operatively mounted respectively between the suspension member 14 and the vehicle body 22 and between the suspension member 16 and the vehicle body 22.

Each of the suspension units 20 and 21 comprises a cylinder 24 fixedly secured to the vehicle body 22 and formed therein a bore 25, a piston 26 axially slidably fitted in the bore 25, and a piston rod 28 extending from the piston 26 outwardly of the cylinder 24 through an end thereof and pivotably connected to the corresponding suspension member. Alternatively, the cylinder 24 and the piston rod 28 may be connected respectively to the corresponding suspension member and the vehicle body 22.

The piston 26 defines in the bore 25 a fluid chamber 29 of variable volume which is filled therein with pressurized hydraulic fluid and which is communicable with a pressurized hydraulic fluid source such as a pump 30 and with a hydraulic fluid reservoir or sump 31, as will be described hereinafter.

Each of the suspension units 20 and 21 also comprises a pressure accumulator 32 having a fluid chamber 34 and a gas chamber 36 separated from each other by a flexible partition member or diaphragm 38. The fluid chamber 34 is filled with pressurized hydraulic fluid and communicates with the fluid chamber 29 of the corresponding suspension unit. The gas chamber 36 is filled with gas under pressure such as, for example, compressed nitrogen and serves as a gas cushion to damp or absorb changes in the volume of or pressure in the fluid chamber of the corresponding suspension unit due to momentary relative movements between the corresponding cylinder and piston 24 and 26 caused by bumps in the road surface over which the vehicle travels.

An automatic vehicle level corrector or regulator valve means 40 is provided to maintain the level of the vehicle body 22 substantially constant independently of a load applied thereto. The level regulator valve 40 is employed in common for both the suspension units 20 and 21 and is located externally of each of the suspension units 20 and 21. The level regulator valve 40 normally obstructs fluid communication between the respective fluid chambers 29 and the pump 30 and provides fluid communication therebetween to allow supply of pressurized hydraulic fluid into the respectively fluid chambers 29 for lengthening the suspension units 20 and 21 in response to falls in the level of the vehicle body 22 due to increases in the load applied thereto. The level regulator valve 40 also normally obstructs fluid communication between the fluid chambers 29 and the reservoir 31 and provides fluid communication therebetween to allow discharge of hydraulic fluid from the fluid chambers 29 for shortening the suspension units 20 and 21 in response to rises in the level of the vehicle body 22 due to decreases in the load applied thereto.

The level regulator valve 40 comprises a casing 42 axially slidably fitted in the vehicle body 22 and formed therein with a bore 44, and a valve spool 46 axially slidably fitted in the bore 44 and formed therein with an annular groove 47. The casing 42 is also formed therein with first, second and third ports 48, 50 and 52 each opening into the bore 44. The first bore 48 communicates with the respective fluid chambers 29 by way of conduits 54 and 56. The second port 50 communicates with the pump 30 by way of conduits 58, 60 and 62. The third port 52 communicates with the reservoir 31 by way of conduits 64 and 66. The valve spool 46 obstructs fluid communication between the first and second ports 48 and 50 and accordingly between the respective fluid chambers 29 and the pump 30 and between the first and third ports 48 and 52 and accordingly between the respective fluid chambers 29 and the reservoir 31 when the casing 42 and the valve spool 46 are in a neutral or rest position shown in the drawing with respect to each other. The annular groove 47 of the valve spool 46 provides fluid communication between the first and second ports 48 and 50 when one of the casing 42 and the valve spool 46 is moved with respect to the other from the neutral position into a first operative position and between the first and third ports 48 and 52 when one of the casing 42 and the valve spool 46 is moved with respect to the other from the neutral position into a second operative position.

The pump 30 draws hydraulic fluid from the reservoir 31 by way of a conduit 72 and pumps pressurized hydraulic fluid into the conduit 62. The pump 30 may be driven by the engine (not shown) of the vehicle or any other suitable drive means such as an electric motor (not shown). The pump 30 communicates with an accumulator 74 by way of the conduit 62 and conduits 76 and 78 and with a pressure relief valve 80 by way of the conduits 62 and 76 and a conduit 82. The accumulator 74 has a gas chamber 84 filled with gas under pressure and a fluid chamber 86 separated from the gas chamber 84 by a flexible diaphragm 88 and filled with pressurized hydraulic fluid and communicating with the conduit 78. The accumulator 74 stores energy of pressurized hydraulic fluid from the pump 30. The relief valve 80 serves to return pressurized hydraulic fluid from the pump 30 to the reservoir 31 by way of a conduit 90 whenever the pressure of hydraulic fluid in the conduit 82 exceeds a predetermined value.

Opposite first and second rods 92 and 94 extend respectively from opposite ends of the valve spool 46 outwardly through opposite ends 96 and 98 of the casing 42. A seal member 100 is provided to form a fluid tight seal between the bore 44 and the outside thereof. A compression spring 102 is disposed between the end 96 of the casing 42 and a spring seat 104 attached to the first rod 92 by suitable fastening means such as a nut 106.

Vehicle level sensing means such as a bar 110 is provided to sense rises and falls in the level of the vehicle body 22 due to increases and decreases in the load applied thereto and to operate the level regulator valve 40 in response to relative movement or distance change between the suspension members 14 and 16 and the vehicle body 22. The bar 110 normally lies generally in parallel to a horizontal plane and has first and second longitudinal portions 114 and 116 each extending longitudinally of the vehicle and pivotably connected respectively to the suspension members 14 and 16 and a transverse portion 118 extending transversely of the vehicle and integral at its ends with the longitudinal portions 114 and 116 and supported at a portion by supporting means such as a bearing (not shown) fixedly attached to the vehicle body 22. The bar 110 is swingable about the axis of the transverse portion 118 by relative movement between the vehicle body 22 and the suspension members 14 and 16. An arm 120 is fixedly secured to a mid portion of the transverse member 118 and extends in parallel to the longitudinal portions 114 and 116 and is operatively connected at its free end to the second rod 94 through a tension spring 122. The springs 102 and 122 urge the valve spool 46 in opposite directions to the neutral position.

A vehicle level selector device or means 126 is provided to selectively cause relative movement between the casing 42 and the valve spool 46 of the level regulating valve 40 to move the valve spool 46 with respect to the casing 42 into the first or second operative position for increasing or reducing the volumes of the fluid chambers 29 to lengthen and shorten the suspension units 20 and 21 independently of the load applied thereto.

The vehicle level selecting device 126 comprises a casing 128 fixedly secured to the valve body 22 and formed therein with a bore 130, and a piston 132 axially slidably fitted in the bore 130 and dividing the bore 130 into first and second chambers 134 and 136. A piston rod 138 extends from one end of the piston 132 outwardly of the casing 128 through the second chamber 136 and is pivotably connected to the end 96 of the casing 42 of the level regulating valve 40. A compression spring 142 is disposed in the first chamber 134 and acts on the other end of the piston 132 to urge the same toward the second chamber 136. The second chamber 136 is filled with pressurized hydraulic fluid and is communicable with the pump 30 and with the reservoir 31. The pressure of hydraulic fluid in the second chamber 136 urges the piston 132, the piston rod 138 and the casing 42 toward the first chamber 134. A seal member 144 is provided to form a fluid tight seal between the second or fluid chamber 136 and the outside thereof. The casing 128 is also formed therein with inlet and outlet passageways 148 and 150 each opening into the second chamber 136. The inlet passageway 148 communicates with the pump 30 by way of a conduit 152 and the conduits 60 and 62. The outlet passageway 150 communicates with the reservoir 31 by way of a conduit 154 and the conduit 66.

A first valve 156 is provided to control fluid communication between the pump 30 and the second chamber 136 and comprises a valve chamber 158 into which the inlet passageway 148 opens and which is stepped at 160 intermediate its ends to form a valve seat. A valve head 162 of a poppet valve type is disposed in the valve chamber 158 and has a flat end and a conical end (no numeral) which engages the valve seat 160 to block the inlet passageway 148. It is important that the conical end is located on a lower pressure side of the valve chamber 158 so that a higher pressure acts on the flat end to press the conical end against the valve seat 160 to provide a self-sealing effect. A compression spring 164 is located in the valve chamber 158 and acts on the flat end of the valve head 162 to urge the conical end thereof to the valve seat 160. A valve stem or operating rod 166 extends from the flat end of the valve head 162 outwardly of the casing 128 and in parallel to the piston rod 138. An engaging head 168 is fixedly secured to the free end of the operating rod 166.

A second valve 170 is provided to control fluid communication between the reservoir 31 and the second chamber 136 and comprises a valve chamber 172 into which the outlet passageway 150 opens and which is stepped at 174 intermediate its ends to form a valve seat. A valve head 176 of a poppet valve type is disposed in the valve chamber 172 and has a flat end and a conical end (no numeral) which engages the valve seat 174 to block the outlet passageway 150. The conical end of the valve head 176 is located on a lower pressure side of the valve chamber 172 so that a higher pressure acts on the flat end to press the conical end against the valve seat 174 to provide a self-sealing function. A compression spring 178 is disposed in the valve chamber 172 and acts on the flat end of the valve head 176 to urge the conical end thereof to the valve seat 174. A valve stem or operating rod 179 extends from the conical end of the valve head 176 outwardly of the casing 128 and in parallel to the piston rod 138.

An operating member 180 is mounted on the piston rod 138 and is spaced apart from the casing 128 so that it is axially movable in opposite one and another directions. The operating rod 166 of the first valve 156 passes through an aperture (not shown) formed through the operating member 180 so that the engaging head 168 is located opposite to the casing 128 with respect to the operating member 180. The operating rod 166 has a suitable length so that the engaging head 168 is spaced apart from the operating member 180 a predetermined distance when the valve head 162 is seated on the valve seat 160 and so that the operating member 180 engages the engaging head 168 to move the operating rod 166 to disengage the valve head 162 from the valve seat 160 when the operating member 180 is moved in the one direction in excess of a predetermined limit. The operating rod 179 has a suitable length so that the free end of the rod 179 is spaced apart from the operating member 180 a predetermined distance when the valve head 176 is seated on the valve seat 174 and so that the operating member 180 engages the free end of the operating rod 179 to move the rod 179 to disengage the valve head 176 from the valve seat 174 when the operating member 180 is moved in the another direction in excess of a predetermined limit.

A lever 182 is pivotably supported at its mid portion on the vehicle body 22 and engages at one end the operating member 180. A compression spring 184 is disposed between the casing 128 and the operating member 180 and urges the same in the one direction so that the lever 182 is urged clockwise in the drawing. A tension spring 186 is disposed between the vehicle body 22 and the other end of the lever 182 to urge the lever 182 clockwise. A vehicle level selector lever 188 is pivotably supported at a mid portion on the vehicle body 22 and is operatively connected at one end to the other end of the lever 182 through a flexible wire cable 190. The level selector lever 188 is swingable at the other end by an operator (not shown) of the vehicle from a neutral position shown in the drawing into vehicle level increasing and reducing positions shown respectively as H and L in the drawing. The operating member 180 and the lever 182 are held by the selector lever 188 in a neutral position shown in the drawing in which the operating member 180 is disengaged from the engaging head 168 and the operating rod 179 so that the valve heads 162 and 176 are seated on the valve seats 160 and 174 when the selector lever 188 is in the neutral position. A stop member 192 is provided to normally hold the operating member 180, the lever 182 and the level selector lever 188 in the neutral position shown in the drawing and to prevent the lever 188 from being moved into the level reducing position L by the action of the springs 184 and 186 when it is undesired that the lever 188 is moved into the position L. The stop member 192 is movable or rotatable by the driver from a normal position shown in the drawing to engage the lever 188 to hold it in the neutral position into a position to allow the lever 188 to be moved into the position L.

The suspension system 18 thus far described is operated as follows.

When the level of the vehicle body 22 is reduced to shorten the suspension units 20 and 21 due to increases in the load applied thereto, the relative distance between the suspension members 14 and 16 and the vehicle body 22 is shortened to rotate the bar 110 about the axis of the tranverse portion 118 thereof so that the arm 120 is rotated upwardly in the drawing. The arm 120 thus rotated compresses the spring 122 to move the valve spool 46 from the neutral position into the first operative position. As a result, the annular groove 47 of the valve spool 46 provides fluid communication between the first and second ports 48 and 50 to cause supply of pressurized hydraulic fluid from the pump 30 into the fluid chambers 29 to lengthen the suspension units 20 and 21. Thus, the level of the vehicle body 22 is increased. When an initial level of the vehicle body 22 is attained, the relative distance between the suspension members 14 and 16 and the vehicle body 22 is lengthened to an initial value to rotate the bar 110 and the arm 120 into the neutral position. As a result, the valve spool 46 is returned into the neutral position to obstruct fluid communication between the first and second ports 48 and 50 to stop supply of pressurized hydraulic fluid into the fluid chambers 29 to complete an auto-levelling operation.

When the level of the vehicle body 22 is increased to lengthen the suspension units 20 and 21 due to decreases in the load applied thereto, the relative distance between the suspension members 14 and 16 and the vehicle body 22 is lengthened to rotate the bar 110 about the axis of the transverse portion 118 thereof so that the arm 120 is rotated downwardly in the drawing. The arm 120 thus rotated extends the spring 122 to move the valve spool 46 from the neutral position into the second operative position. As a result, the annular groove 47 of the valve spool 46 provides fluid communitation between the first and third ports 48 and 52 to causing discharge of hydraulic fluid from the fluid chambers 29 into the reservoir 31 to shorten the suspension units 20 and 21. Thus, the level of the vehicle body 22 is reduced. When the initial level of the vehicle body 22 is attained, the relative distance between the suspension members 14 and 16 and the vehicle body 22 is shortened to the initial value to rotate the bar 110 and the arm 120 into the neutral position. As a result, the valve spool 46 is returned into the neutral position to obstruct fluid communication between the first and third ports 48 and 52 to stop discharge of hydraulic fluid from the fluid chambers 29 to complete an auto-levelling operation.

Figure 2:
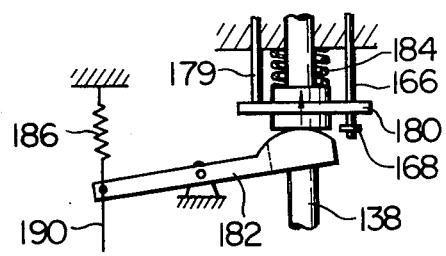
FIGS. 2 and 3 are schematic fragmentary views showing operating states of a part of the suspension system shown in FIG. 1.

When the vehicle operator wants to raise the level of the vehicle body 22, the level selector lever 188 is rotated by the operator into the level increasing position H to rotate the lever 182 through the wire cable 190 counterclockwise against the action of the springs 184 and 186 to move the operating member 180 upwardly, as shown in FIG. 2 of the drawings. The operating member 180 thus moved engages the operating rod 179 and moves the same to disengage the valve head 176 from the valve seat 174 so that fluid communication is provided between the reservoir 31 and the second chamber 136 to cause discharge of hydraulic fluid therefrom into the reservoir 31. As a result, the piston 132 is moved by the action of the spring 142 downwardly in the drawing to move the casing 42 through the piston rod 138 downwardly. Thus, the valve spool 46 is moved with respect to the casing 42 into the first operative position to provide fluid communication between the first and second ports 48 and 50 and accordingly between the fluid chambers 29 and the pump 30 so that the level of the vehicle body 22 is raised. Since the valve spool 46 is moved downwardly by the action of the arm 120 due to a rise in the level of the vehicle body 22 as the casing 42 is moved downwardly by the piston 132, the fluid communication between the ports 48 and 50 is continued to cause a continuous rise in the level of the vehicle body 22 during downward movement of the piston 132. When a desired level of the vehicle body 22 is attained, the operator looses his hold of the lever 188 so that the operating member 180 and the levers 182 and 188 are returned into the neutral position by the action of the springs 184 and 186. As a result, the valve head 176 is seated on the valve seat 174 by the action of the spring 178 to stop discharge of hydraulic fluid from the second chamber 136. Thus, the downward movement of the piston 132 is stopped and the vehicle body 22 is maintained in the desired level corresponding to the position of the piston 132.

Figure 3:
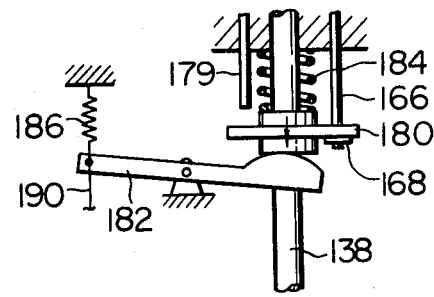

When the operator wants to lower the level of the vehicle body 22, the stop member 192 is disengaged from the level selector lever 188 by the operator so that the lever 188 is rotated into the level reducing position L by the action of the springs 184 and 186 and concurrently the operating member 180 is moved downwardly by the action of the spring 184 to engage the engaging head 169 of the operating rod 166 and to move the same downwardly, as shown by the arrow in FIG. 3 of the drawings. The operating rod 166 thus moved unseats the valve head 162 of the first valve 156 from the valve seat 160 so that fluid communication is provided between the pump 30 and the second chamber 136 to cause the supply of pressurized hydraulic fluid thereinto from the pump 30. As a result, the piston 132 is moved upwardly in the drawing by the pressure of hydraulic fluid in the second chamber 136 overcoming the action of the spring 134 to move the casing 42 through the piston rod 138 upwardly. Thus, the valve spool 46 is moved with respect to the casing 42 into the second operative position to provide fluid communication between the first and third ports 48 and 52 and accordingly between the fluid chambers 29 and the reservoir 31 so that the level of the vehicle body 22 is lowered. Since the valve spool 46 is moved upwardly by the action of the arm 120 due to falls in the level of the vehicle body 22 as the casing 42 is moved upwardly by the action of the piston 132, the fluid communication between the ports 48 and 52 is continued to cause a continuous fall in the level of the vehicle body 22 during upward movement of the piston 132. When a desired level of the vehicle body 22 is attained, the lever 188 and accordingly the operating member 180 and the lever 182 are moved into the neutral position by the action of the operator overcoming the action of the springs 184 and 186 and the stop member 192 is moved by the operator to engage the lever 188 to hold the operating member 180 and the levers 182 and 188 in the neutral position. As a result, the valve head 162 is seated on the valve seat 160 by the action of the spring 164 to stop supply of pressurized hydraulic fluid into the fluid chamber 136. Thus, the upward movement of the piston 132 is stopped and the vehicle body 22 is maintained in the desired level corresponding to the position of the piston 132.

It will be appreciated that a piston is operatively connected to a level regulator valve located externally of a suspension unit and is moved to cause relative movement between a casing and a valve spool of the level regulator valve for selectively shortening and lengthening the suspension unit independently of a load applied thereto by feeding and discharging hydraulic fluid into and from the fluid chamber by the opening of valves operated by a vehicle operator so that the operator can move a level selector lever with a considerably small operating force the maximum of which is equal to a force overcoming the force of the springs 178, 184 and 186 which the operator needs when he disengages the valve head 176 from the valve seat 174 to heighten the level of the vehicle body 22.

Although the suspension system 18 has been described such that the casing 42 and the valve spool 46 are connected respectively to the piston rod 138 and the arm 120, the suspension system 18 can be modified such that alternatively the casing 42 and the valve spool 46 are connected respectively to the arm 120 and the piston rod 138.

What is claim is:

1. A suspension system for a vehicle comprising, a retractable and extensible suspension unit having a cylinder which has defined therein a fluid chamber of variable volume filled with pressurized fluid and is communicable in operation with a pressurized fluid source and alternatively with a drain line, level regulator means for maintaining the level of a vehicle body substantially constant independently of a load applied thereto and located externally of said suspension unit, said level regulator means having means operable to a position for normally obstructing fluid communication between said source and said fluid chamber and to a position for providing fluid communication therebetween to allow supply of pressurized fluid into said fluid chamber for lengthening said suspension unit in response to falls of the level of said vehicle body due to increases in a load applied thereto and operable to a position for normally obstructing fluid communication between said drain line and said fluid chamber and to a position for providing fluid communication therebetween to allow discharge of fluid from said fluid chamber for shortening said suspension unit in response to rises of the level of said vehicle body due to decreases in said load applied thereto, level selector means operatively connected to said level regulator means for hydraulically and selectively operating said level regulator means to a position effective to provide communication between said source and said fluid chamber for lengthening said suspension unit and to a position to provide fluid communication between said drain line and said fluid chamber for shortening said suspension unit independently of said load applied to the vehicle body, said level selector means comprising a casing formed therein with a bore, a piston slidably fitted in said bore and defining therein a second fluid chamber which is filled with pressurized fluid and is communicable in operation with said pressurized fluid source and with a drain line, the pressure of fluid in said second fluid chamber urging said piston in one direction, a piston rod extending from said piston outwardly of said casing through said second fluid chamber and operatively connected to said level regulator means, biasing means for urging said piston in another direction opposite to said one direction, valve means operable for alternatively obstructing and providing communication between said source and said second fluid chamber and for alternatively obstructing and providing communication between said drain line and said second fluid chamber, and operating means for selectively operating said valve means for providing communication between said source and said second fluid chamber to allow supply of pressurized fluid thereinto and to provide communication between said drain line and second fluid chamber to allow discharge of fluid therefrom, said piston being moved in said one direction by the pressure of fluid in said second fluid chamber against the action of said biasing means to operate said level regulator means through said piston rod to provide communication between said drain line and said fluid chamber of said suspension unit for shortening thereof when pressurized fluid is supplied into said second fluid chamber, said piston being moved in said another direction by the action of said biasing means against the pressure of fluid in said second fluid chamber to operate said level regulator means through said piston rod to provide communication between said source and said fluid chamber of said suspension unit for lengthening thereof when fluid is discharged from said second fluid chamber.

2. A suspension system as claimed in claim 1, in which said valve means comprises a first valve head operable to alternatively block and provide communication between said source and said second fluid chamber and a second valve head operable to alternatively block and provide communication between said drain line and said second fluid chamber, and said operating means comprises an operating member axially movably mounted on said piston rod and movable in opposite first and second directions, a first operating rod for operating said first valve head to provide communication between said source and said second fluid chamber in reponse to movement of said operating member in said first direction in excess of a predetermined limit, a second operating rod for operating said second valve head to provide communication between said drain line and said second fluid chamber in response to movement of said operating member in said second direction in excess of a predetermined limit, a level selector lever movable alternatively into level-increasing and level-reducing positions, and control means for causing said operating member to move in said first and second directions in excess of said predetermined limits in response to movements of said level selector lever into said level-reducing and level-increasing positions, respectively and for holding said operating member and said level selector lever in a neutral position in which said first and second valve heads block communication between said source and said second fluid chamber and between said drain line and said second fluid chamber, respectively.

3. A suspension system as claimed in claim 2, in which said control means comprises an operating lever pivotably supported at its mid portion and engaging at one end said operating member, a flexible wire cable operatively connecting the other end of said operating lever to said level selector lever, biasing means urging said operating member in said first direction and said level selector lever to said level reducing position through said operating lever and said wire cable, and a stop member engageable with said level selector lever to hold said operating member, said operating lever and said level selector lever in said neutral position and disengageable from said level selector lever to allow the same to move into said level reducing position, and said operating member being movable in said second direction by the action of said operating lever when said level selector lever is moved into said level increasing position.

4. A suspension system as claimed in claim 2, in which said first operating rod extends from said first valve head and passes through said operating member and has an engaging head fixedly secured to a free end of said first operating rod and spaced apart from said operating member in said neutral position and engaged by said operating member moved in said first direction in excess of said predetermined limit, and said second operating rod extends from said second valve head toward said operating member and spaced apart from said operating member in said neutral position and engaged by said operating member moved in said second direction in excess of said predetermined limit.

5. A suspension system as claimed in claim 1, in which level regulator means comprises a casing slidably supported by said piston rod and formed therein with a bore and first, second and third ports each opening into said bore, said first port communicating with said fluid chamber of said suspension unit, said second port communicating with said source, said third port communicating with said drain line, a valve spool axially slidably fitted in said bore and formed therein with an annular groove, said annular groove providing fluid communication between said source and said fluid chamber of said suspension unit when said valve spool is moved with respect to said casing into said first operative position and between said drain line and said fluid chamber of said suspension unit when said valve spool is moved with respect to said casing into said second operative position, and an arm operatively connected to said valve spool and moving the same into said first and second operative positions in response to falls and rises in the level of the vehicle body due to increases and decreases in the load applied thereto.

6. A suspension system for a vehicle, comprising a suspension unit having therein a first fluid chamber filled with pressurized fluid and communicable in operation alternatively with a pressurized fluid source and with a drain line, level regulator means for maintaining the length of said suspension unit substantially constant independently of a load which is applied, said level regulator means having a normal position for obstructing first communication between said first fluid chamber and said source and second communication between said first fluid chamber and said drain line, a first position for providing said first communication to allow supply of pressurized fluid into said first fluid chamber for lengthening of said suspension unit, and a second position for providing said second communication to allow discharge of fluid from said first fluid chamber for shortening of said suspension unit, means for moving said level regulator means automatically into said first position and said second position in response to an increase and a reduction in said load, respectively, said level selector means for manually lengthening and shortening said suspension unit independently of said load, said level selector means comprising a second fluid chamber located externally of said suspension unit and filled with pressurized fluid and communicable in operation with a pressurized fluid source and a drain line, means for mechanically and operatively connecting said level selector means to said level regulator means and for alternatively moving said level regulator means into said first and second positions to lengthen and shorten said suspension unit by the force of pressurized fluid in said second fluid chamber when the volume of pressurized fluid therein is varied, valve means operable for alternatively providing third communication between said source and said second fluid chamber to allow supply of pressurized fluid thereinto and fourth communication between said drain line and said second fluid chamber to allow discharge of fluid therefrom for varying the volume of pressurized fluid in said second fluid chamber, and operating means for manually operating said valve means to alternatively provide said third communication and said fourth communication.

7. A suspension system as claimed in claim 6, in which said level selector means comprises a casing having therein a bore, a piston slidably fitted in said bore and defining therein said second fluid chamber together with said casing, and biasing means for urging said piston toward said second fluid chamber in opposition to the force of pressurized therein, and said connecting means comprising a piston rod extending from said piston and connected to said level regulator means.

* * * * *